(12) United States Patent
Takeuchi et al.

(10) Patent No.: US 11,035,383 B2
(45) Date of Patent: Jun. 15, 2021

(54) FAN SHROUD

(71) Applicant: DENSO CORPORATION, Kariya (JP)

(72) Inventors: Kazuhiro Takeuchi, Kariya (JP); Masashi Matsukawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 197 days.

(21) Appl. No.: 16/183,866

(22) Filed: Nov. 8, 2018

(65) Prior Publication Data

US 2019/0072111 A1 Mar. 7, 2019

Related U.S. Application Data

(63) Continuation of application No. PCT/JP2017/017732, filed on May 10, 2017.

(30) Foreign Application Priority Data

May 11, 2016 (JP) .............................. JP2016-095196
Feb. 20, 2017 (JP) .............................. JP2017-029368

(51) Int. Cl.
*F04D 29/66* (2006.01)
*B60K 11/02* (2006.01)
*F04D 29/54* (2006.01)
*B60K 11/06* (2006.01)
*F04D 19/00* (2006.01)
*F04D 29/52* (2006.01)
*B60H 1/00* (2006.01)

(52) U.S. Cl.
CPC ............ *F04D 29/661* (2013.01); *B60K 11/02* (2013.01); *B60K 11/06* (2013.01); *F04D 19/002* (2013.01); *F04D 29/522* (2013.01); *F04D 29/547* (2013.01); *F04D 29/667* (2013.01); *B60H 1/00464* (2013.01); *B60H 2001/006* (2013.01)

(58) Field of Classification Search
CPC .... F04D 29/661; F04D 19/002; F04D 29/522; F04D 29/547; F04D 29/667; B60K 11/02; B60K 11/06
See application file for complete search history.

(56) References Cited

FOREIGN PATENT DOCUMENTS

JP 2011052556 A * 3/2011

* cited by examiner

*Primary Examiner* — David E Sosnowski
*Assistant Examiner* — Sabbir Hasan
(74) *Attorney, Agent, or Firm* — Harness, Dickey & Pierce, P.L.C.

(57) ABSTRACT

A fan shroud includes a bell mouth portion and a rectangular portion. The bell mouth portion includes a circular wall that defines a discharge port and accommodates a propeller fan. The rectangular portion defines a suction port and includes a close wall close to the circular wall, and a farther wall farther from the circular wall than the close wall is from. The close wall includes a closest portion closest to the circular wall in the close wall, and a pair of connection portions connected to the farther wall. The closest wall is between the pair of connection portions. The fan shroud includes an opening portion extending through the rectangular portion from inside to outside of the rectangular portion. At least one of the pair of connection portions includes the opening portion, and the closest portion does not include the opening portion.

5 Claims, 8 Drawing Sheets

//FAN SHROUD

CROSS REFERENCE TO RELATED APPLICATION

The present application is a continuation application of International Patent Application No. PCT/JP2017/017732 filed on May 10, 2017, which designated the U.S. and claims the benefit of priority from Japanese Patent Application No. 2016-095196 filed on May 11, 2016, and Japanese Patent Application No. 2017-029368 filed on Feb. 20, 2017. The entire disclosures of all of the above applications are incorporated herein by reference.

TECHNICAL FIELD

The present disclosure relates to a fan shroud through which air flows from a suction port to a discharge port.

BACKGROUND

Typical fan shroud includes a suction port and a discharge port, and air flows through the fan shroud from the suction port to the discharge port. A propeller fan is accommodated in a bell mouth portion of the fan shroud. When the propeller fan rotates, an air flow is generated in the fan shroud, and thereby a condenser and a radiator are cooled.

SUMMARY

A fan shroud according to the present disclosure, through which air flows from a suction port to a discharge port, includes: a bell mouth portion including a circular wall that defines the discharge port and accommodating a propeller fan; and a rectangular portion defining the suction port and including a close wall close to the circular wall, and a farther wall farther from the circular wall than the close wall is from. The close wall includes a closest portion closest to the circular wall in the close wall, and a pair of connection portions connected to the farther wall. The close wall is between the pair of connection portions. The fan shroud includes an opening portion extending through the rectangular portion from inside to outside of the rectangular portion. At least one of the pair of connection portions includes the opening portion, and the closest portion does not include the opening portion.

EMBODIMENTS

Figure 1:
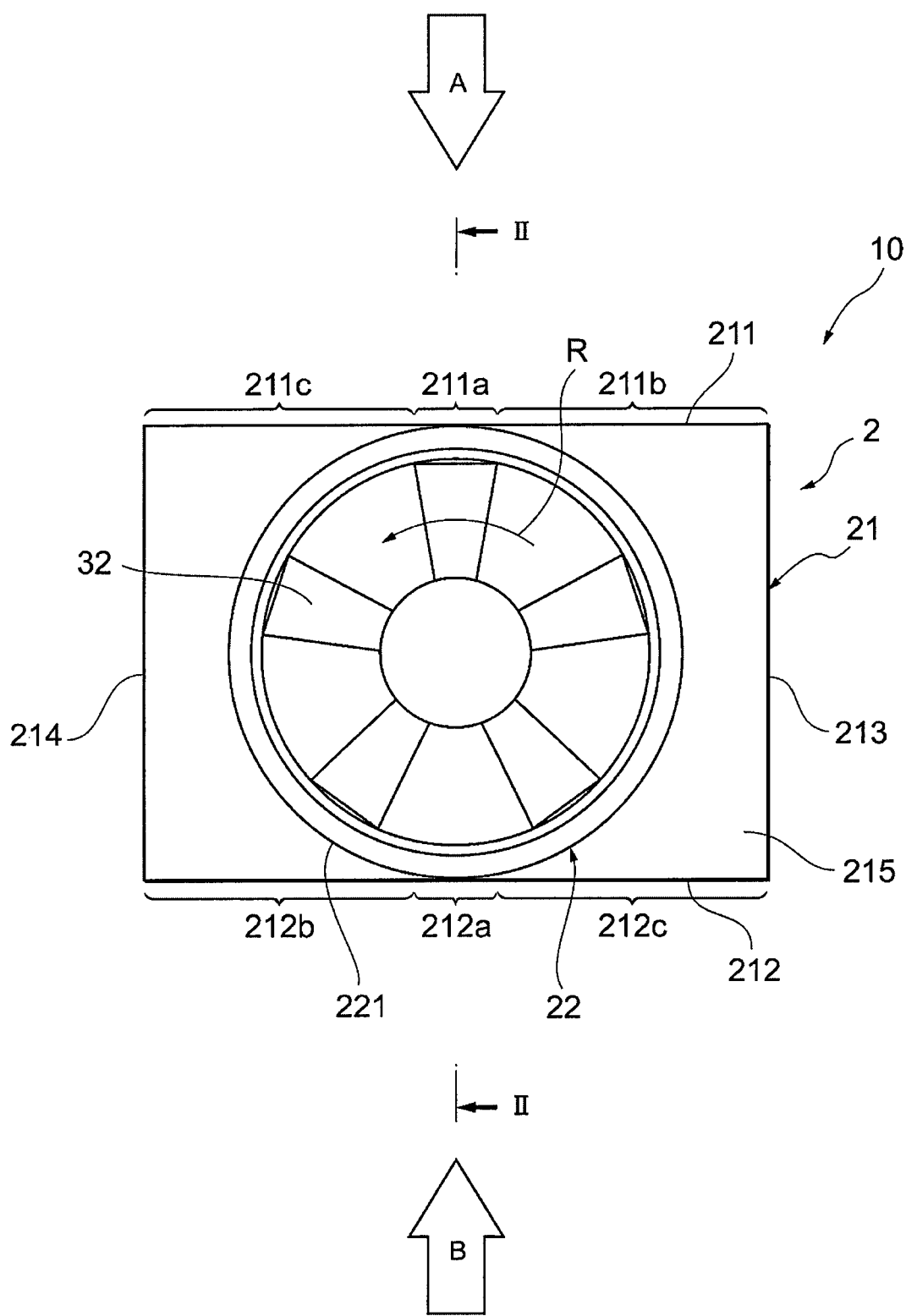
FIG. 1 is a front view illustrating a fan shroud according to at least one embodiment of the present disclosure.

Hereinafter, the present embodiments will be described with reference to the attached drawings. In order to facilitate the ease of understanding, the same reference numerals are attached to the same constituent elements in each drawing where possible, and redundant explanations are omitted.

Figure 2:
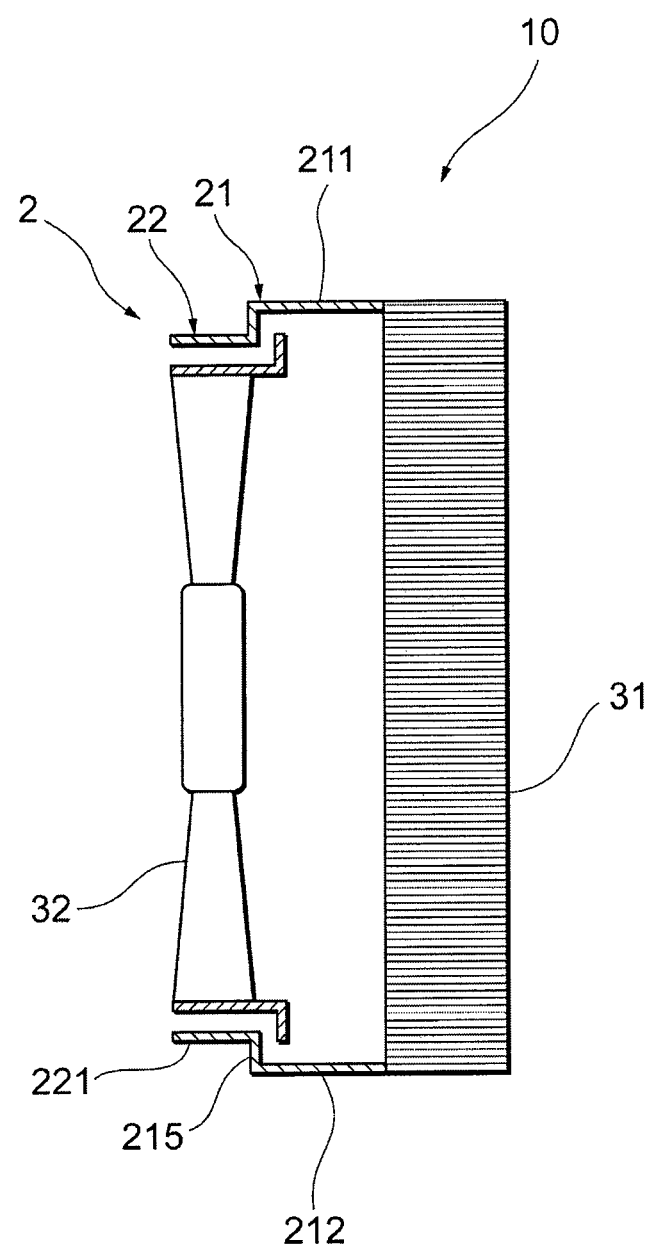
FIG. 2 is a cross-sectional view taken along a line II-II in FIG. 2.

As shown in FIGS. 1, 2, a fan shroud 2 of a first embodiment is applied to a vehicular cooling system 10. The vehicular cooling system 10 includes the fan shroud 2, a heat exchanger 31, a propeller fan 32, and a driving motor (not shown).

The heat exchanger 31 serves as a condenser for an air-conditioner or a radiator for cooling a traveling engine. One heat exchanger 31 that serves as a condenser or a radiator may be provided, or one condenser and one radiator may be provided.

The condenser is a device for a refrigeration cycle of an air-conditioner. The condenser includes an air passage for exchanging heat between outside air and a high-temperature and high-pressure gas refrigerant flowing from a compressor. The refrigerant that has condensed to be a liquid-phase by the heat exchange with air flows to a downstream device constituting the refrigeration cycle.

The radiator is a device for cooling a cooling water of the traveling engine. The cooling water that has cooled a combustion chamber of the engine and has become hot is pumped to flow into the radiator. The air passage is defined in the radiator to exchange heat between the high-temperature cooling water and the outside air. The cooling water cooled by the heat exchange with air returns to the engine to cool the engine.

The air flows from a suction port of the fan shroud 2 to a discharge port of the fan shroud 2. The air flows through the air passage in the heat exchanger 31. The fan shroud 2 includes a rectangular portion 21 and a bell mouth portion 22.

The rectangular portion 21 includes close walls 211, 212 and father walls 213, 214 that form a rectangular frame along an outer periphery of the heat exchanger 31. The rectangular portion 21 includes a connection plate portion 215 connecting together the close walls 211, 212 and the farther walls 213, 214. The bell mouth portion 22 includes a circular wall 221 having a circular cylindrical shape. The circular wall 221 extends from a circumference of a circular opening formed in the connection plate portion 215. The circular wall 221 has a circular cylindrical shape along an outer periphery of the propeller fan 32.

The propeller fan 32 is driven by the driving motor and sends air to the heat exchanger 31. The propeller fan 32 is housed in the bell mouth portion 22. An air flow through the heat exchanger 31 is formed by rotation of the propeller fan 32. A heat exchanger 31 side of the fan shroud 2 is the suction port for the air, and a bell mouth portion 22 side of the fan shroud 2 is the discharge port for the air. In the present embodiment, a direction of the rotation of the propeller fan 32 is illustrated as a rotation direction R.

The close walls 211, 212 are wall members close to the circular wall 221. The father walls 213, 214 are wall members farther from the circular wall 221 than the close walls 211, 212 are.

The close wall 211 includes a closest portion 211a and a pair of connection portions 211b, 211c. The closest portion 211a is the closest to the circular wall 221. The closest portion 211a is between the pair of the connection portions 211b, 211c. The connection portion 211b is connected to the father wall 213, and the connection portion 211c is connected to the father wall 214. The connection portion 211b is located upstream in the rotation direction R of the propeller fan 32. The connection portion 211b is an upstream connection portion of the present disclosure. The connection portion 211c is located downstream in the rotation direction of the propeller fan 32. The connection portion 211c is a downstream connection portion of the present disclosure. The upstream connection portion may be a first connection portion. The downstream connection portion may be a second connection portion. The first connection portion, the closest portion, and the second connection portion are aligned in the rotation direction R in this order.

The close wall 212 includes a closest portion 212a and a pair of connection portions 212b, 212c. The closest portion 212a is the closest to the circular wall 221. The closest portion 212a is between the pair of the connection portions 212b, 212c. The connection portion 212b is connected to the father wall 214, and the connection portion 212c is connected to the father wall 213. The connection portion 212b is located upstream in the rotation direction of the propeller fan 32. The connection portion 212b is an upstream connection portion of the present disclosure. The connection portion 212c is located downstream in the rotation direction of the propeller fan 32. The connection portion 212c is a downstream connection portion of the present disclosure.

Figure 3:
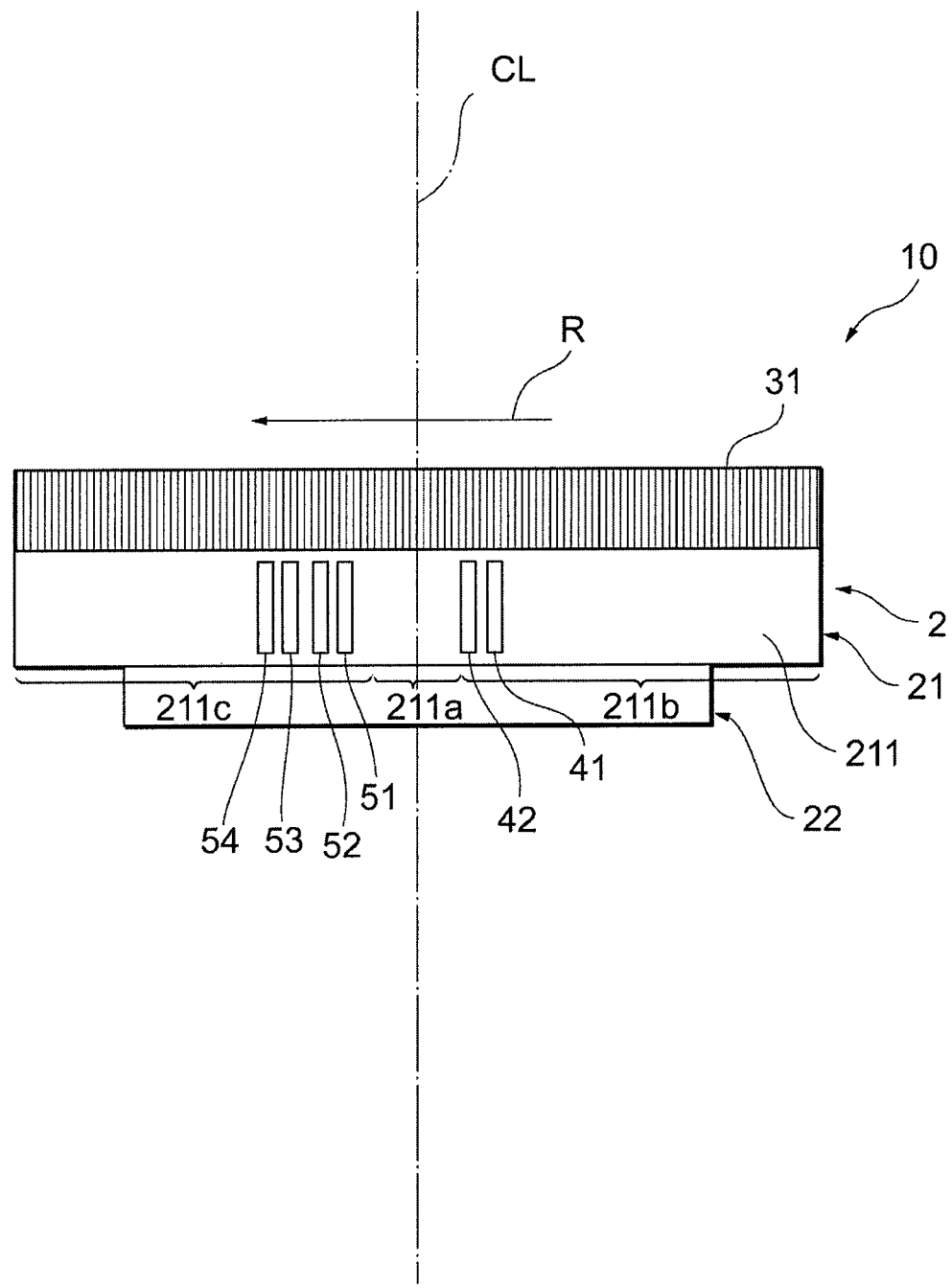
FIG. 3 is a view in a direction of arrow A in FIG. 1.

As shown in FIG. 3, the closest portion 211a of the present embodiment does not include an opening portion. The closest portion 211a is a part including and around a center line CL passing through a rotation center of the propeller fan 32. The closest portion 211a is not opened on the center line CL. The connection portion 211b that is the upstream connection portion includes upstream separated opening portions 41, 42. The upstream separated opening portions 41, 42 correspond to the upstream opening portion of the present disclosure as a whole. The connection portion 211c that is the downstream connection portion includes downstream separated opening portions 51, 52, 53, 54. The downstream separated opening portions 51, 52, 53, 54 correspond to the downstream opening portion of the present disclosure as a whole. The upstream opening portion may be a first opening portion. The upstream separated opening portion may be a first separated opening portion. The downstream opening portion may be a second opening portion. The downstream separated opening portion may be a second separated opening portion.

The upstream separated opening portions 41, 42 and the downstream separated opening portions 51, 52, 53, 54 have the same opening area. Accordingly, the opening area in the connection portion 211c including four downstream separated opening portions 51, 52, 53, 54 is larger than the opening area in the connection portion 211b including two upstream separated opening portions 41, 42.

Figure 4:
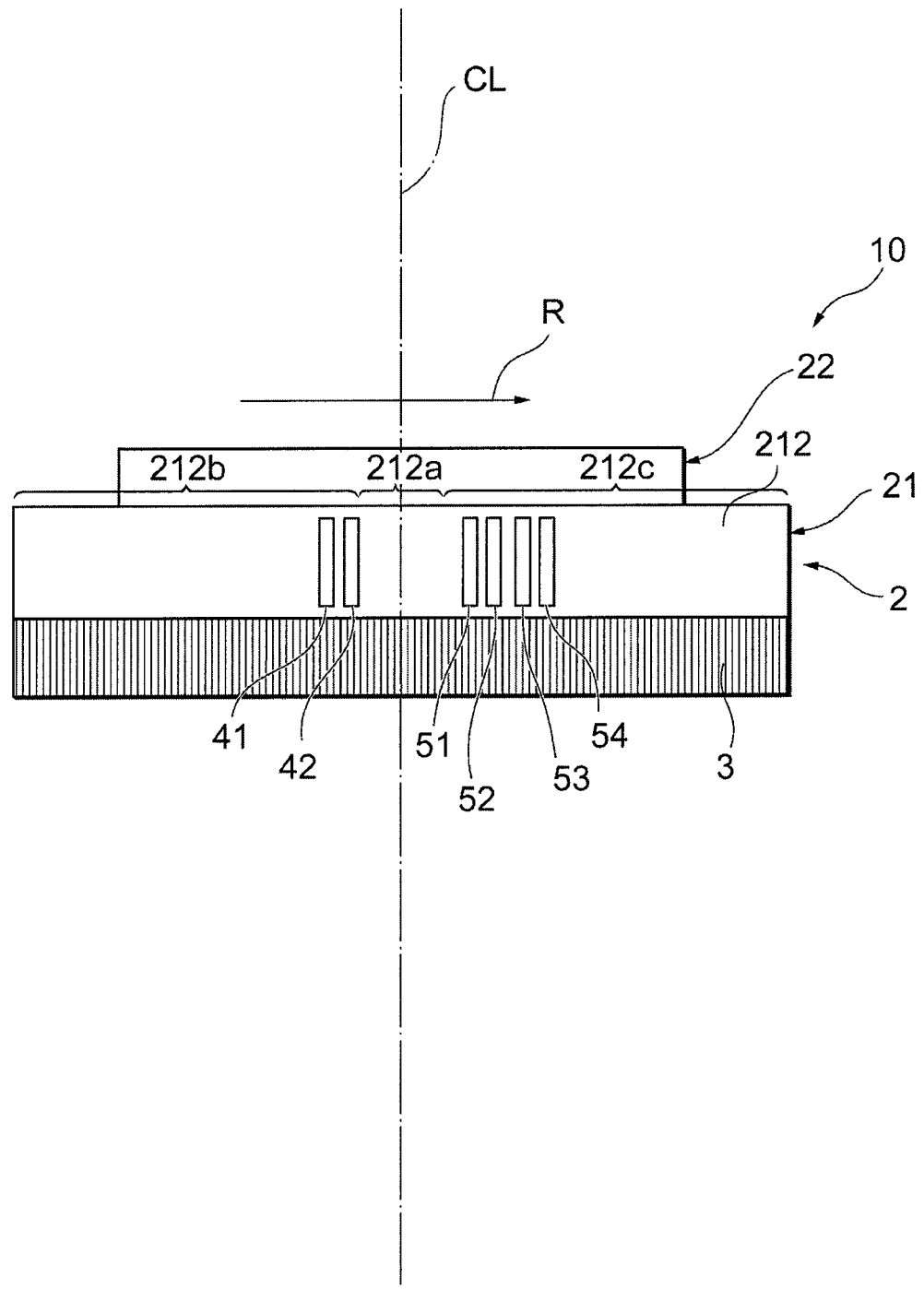
FIG. 4 is a view in a direction of arrow B in FIG. 1.

As shown in FIG. 4, the closest portion 212a of the present embodiment does not include an opening portion. The connection portion 212b that is the upstream connection portion includes upstream separated opening portions 41, 42. The upstream separated opening portions 41, 42 correspond to the upstream opening portion of the present disclosure as a whole. The connection portion 212c that is the downstream connection portion includes downstream separated opening portions 51, 52, 53, 54. The downstream separated opening portions 51, 52, 53, 54 correspond to the downstream opening portion of the present disclosure as a whole.

The upstream separated opening portions 41, 42 and the downstream separated opening portions 51, 52, 53, 54 have the same opening area. Accordingly, the total opening area of the connection portion 212c including four downstream separated opening portions 51, 52, 53, 54 is larger than the total opening area of the connection portion 212b including two upstream separated opening portions 41, 42.

As described above, the air flows from the suction port to the discharge port of the fan shroud 2 according to the present embodiment. The fan shroud 2 includes: the bell mouth portion 22 including the circular wall 221 that defines the discharge port and accommodating the propeller fan; and the rectangular portion 21 defining the suction port, the rectangular portion including the close walls 211, 212 close to the circular wall 221 and the father walls 213, 214 farther from the circular wall than the close walls 211, 212 are.

The close wall 211, 212 includes the closest portions 211a, 212a that is the closest to the circular wall 221, and the pair of connection portions 211b, 211c, 212b, 212c connected to the father walls 213, 214 and located on both sides of the closest portions 211a, 212a. The upstream separated opening portions 41, 42 or the downstream separated opening portions 51, 52, 53, 54 which extend through from inside to outside are provided in at least one of the connection portions 211b, 211c or in one of the connection portions 212b, 212c. The closest portions 211a, 212a do not include the opening portion.

If the fan shroud does not include the opening portion, air flows into the fan shroud sufficiently at a part and insufficiently at another part when the propeller fan rotates. As a result, an annoying noise may occur periodically.

A fan shroud according to a comparative example of the present disclosure includes an opening in the closest portion. According to the comparative example, although a primary frequency noise may decrease, a second frequency noise may increase. The primary frequency noise is a first peak sound having a frequency of N*Z/60, where N is the number of blades of the propeller fan, and Z is a rotational speed (rpm). The secondary frequency noise is a second peak sound having a wavelength approximately twice the wavelength of the primary frequency noise. Since the second frequency noise is higher in frequency than the primary frequency noise, it is preferable that the second frequency noise is lower in sound pressure than the primary frequency noise. However, in the fan shroud according to the comparative example, the sound pressure of the secondary frequency noise may be equal to or larger than the primary frequency noise.

Figure 5:
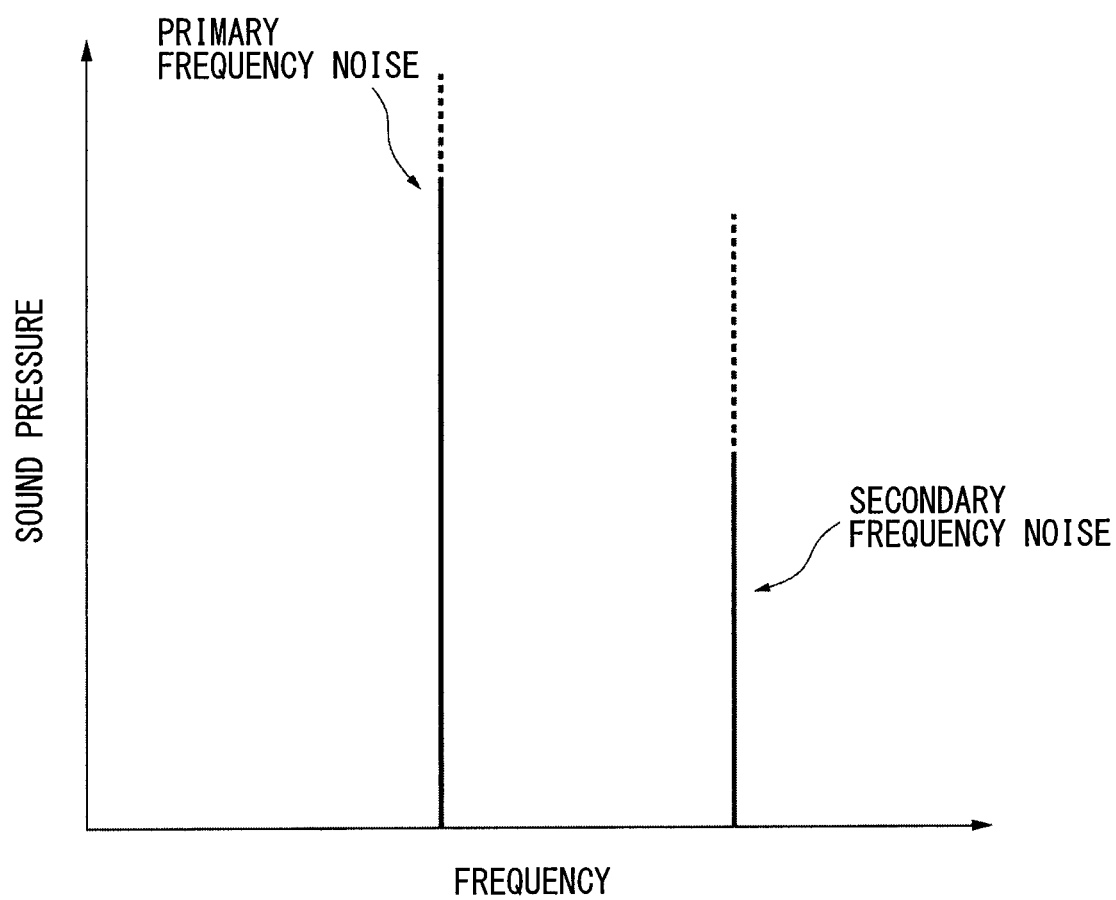
FIG. 5 is a diagram for explaining effects of the embodiments.

In contrast, in the present embodiment, since the closest portion 211a, 212a do not include the opening portion, and since the upstream separated opening portions 41, 42 and the downstream separated opening portions 51, 52, 53, 54 are provided in the connection portions 211b, 211c, the primary frequency noise can be suppressed without an increase of the secondary frequency noise. As shown in FIG. 5, primary frequency noise increases to a level described with a dashed line if no countermeasure is taken. The opening portions can reduce the primary frequency noise to a level described with a solid line. If the closest portion includes the opening portion, the secondary frequency noise increases up to the level described with the dashed line. However, since the closest portions 211a, 212a do not include the opening portion, the secondary frequency noise can be suppressed to the level described with the solid line. That is, since the secondary frequency noise can be suppressed, a generation of annoying noise can be suppressed. In the present embodiment, the center of the rectangular portion 21 and the center of the bell mouth portion 22 overlap each other. However, the center of the bell mouth portion 22 may be close to the father wall 213 or the father wall 214.

In the present embodiment, the pairs of connection portions include the connection portions 211b, 212b which are the upstream connection portions located upstream in the rotation direction R of the propeller fan 32, and the connection portions 211c, 212c which are the downstream connection portions located downstream in the rotation direction R of the propeller fan 32. The opening portion includes the upstream separated opening portions 41, 42 which are the upstream opening portions provided in the upstream connection portions 211b, 212b, and the downstream separated opening portions 51, 52, 53, 54 which are the downstream opening portions provided in the downstream connection portions 211c, 212c.

Since the propeller fan 32 blows air by rotating, the air flowing from the downstream side, in the rotation direction R, of the closest portions 211a, 212a to the closest portions 211a, 212a flows against the rotation direction of the propeller fan 32, and a relative speed of the propeller fan 32 increases to generate uneven distribution of negative pressure. Since the opening area in the downstream side in the rotation direction R of the propeller fan 32 is larger than the opening area in the upstream side, the uneven distribution of the negative pressure can be uniformed. Accordingly, the increase of the secondary frequency noise can be suppressed as shown in FIG. 5.

In the present embodiment, the upstream opening portion includes multiple upstream separated opening portions 41, 42, and the downstream opening portion includes multiple downstream separated opening portions 51, 52, 53, 54. Further, the number of the downstream separated opening portions 51, 52, 53, 54 is larger than the number of the upstream separated opening portions 41, 42.

The design of the upstream opening portion and the downstream opening portion is not limited to the above-described example. The area and the number of the upstream separated opening portions and those of the downstream separated opening portions may be the same as long as the closest portions 211a, 212a do not include the opening portion. Only one of the upstream opening portion and the downstream opening portion may be provided as long as the closest portions 211a, 212a do not include the opening portion.

Figure 6:
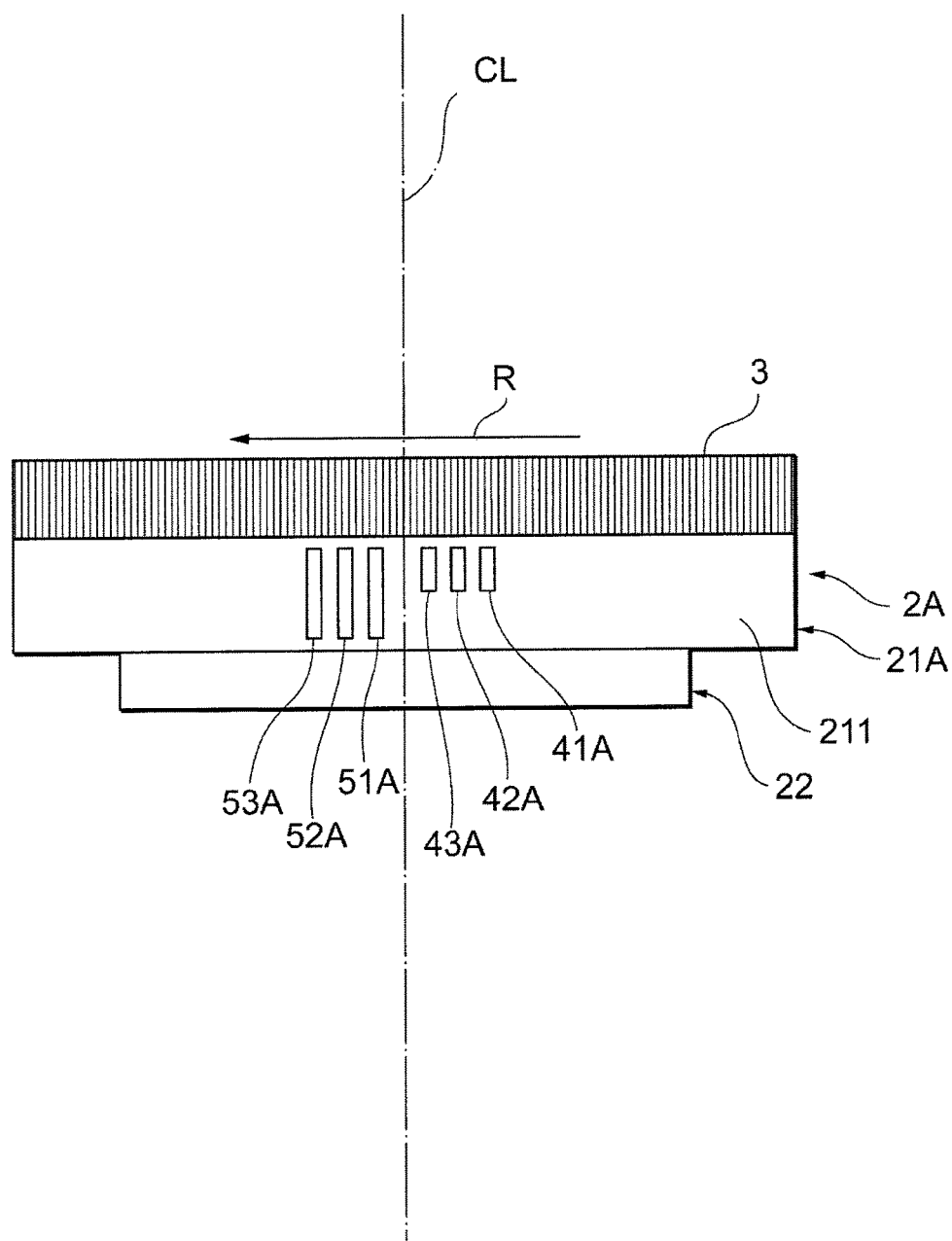
FIG. 6 is a plan view illustrating a fan shroud according to at least one embodiment of the present disclosure.

A fan shroud 2A of a second embodiment will be described with reference to FIG. 6. The fan shroud 2A includes a rectangular portion 21A as shown in FIG. 6. The rectangular portion 21A includes upstream separated opening portions 41A, 42A, 43A, and downstream separated opening portions 51A, 52A, 53A. The number of the upstream separated opening portions 41A, 42A, 43A and the number of the downstream separated opening portions 51A, 52A, 53A are the same.

The opening area of each one of the downstream separated opening portions 51A, 52A, 53A are larger than that of the upstream separated opening portions 41A, 42A, 43A. Accordingly, the total opening area of the downstream separated opening portions 51A, 52A, 53A are larger than the total opening area of the upstream separated opening portions 41A, 42A, 43A. Specifically, the width of the upstream separated opening portions 41A, 42A, 43A is the same as the width of the downstream separated opening portions 51A, 52A, 53A, and the length of the downstream separated opening portions 51A, 52A, 53A is twice larger than the length of the upstream separated opening portions 41A, 42A, 43A. The "width" is a length along the rotation direction R of the propeller fan 32, and the "length" is a length in a direction intersecting the rotation direction R.

Figure 7:
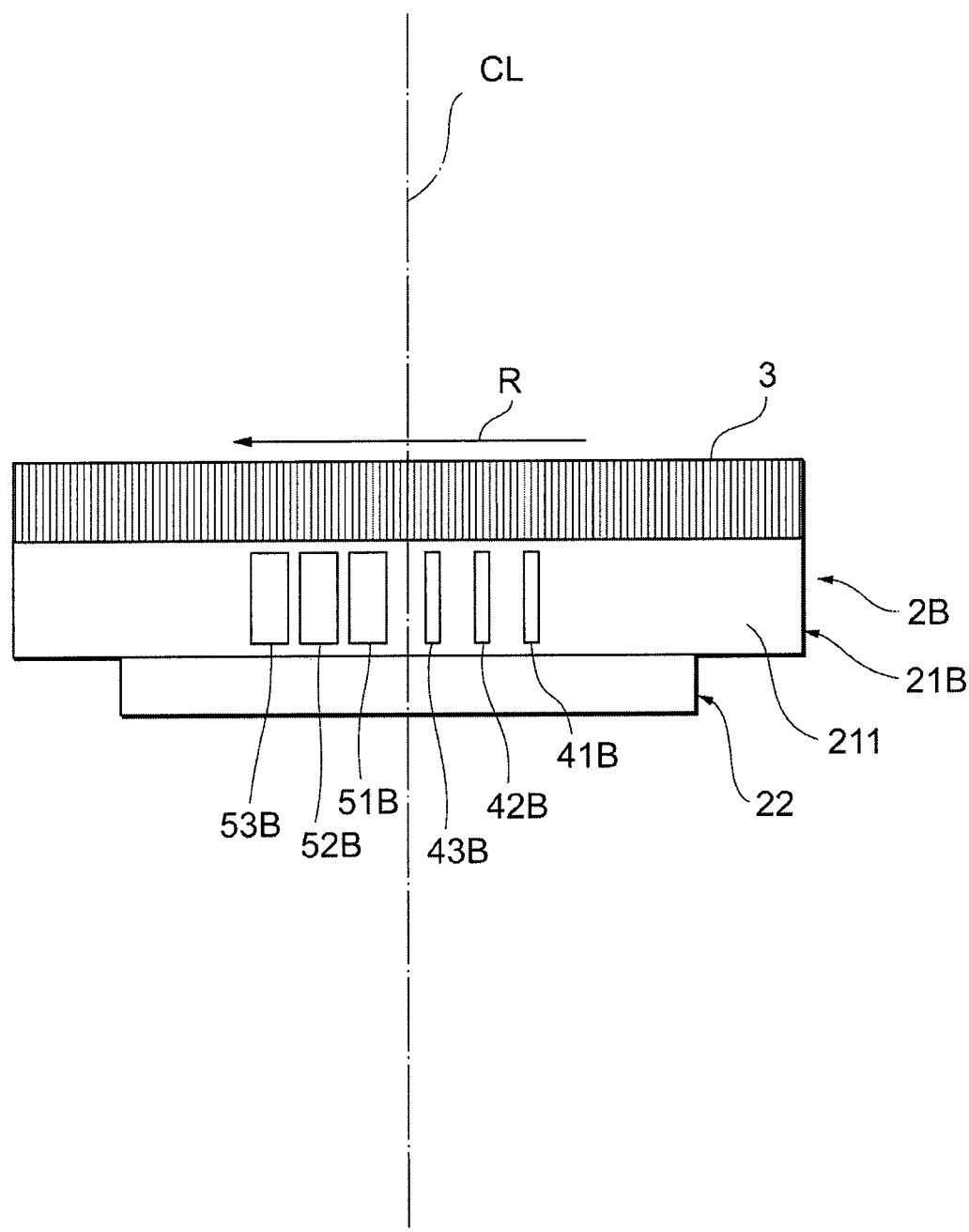
FIG. 7 is a plan view illustrating a fan shroud according to at least one embodiment of the present disclosure.

Next, a fan shroud 2B of a third embodiment will be described with reference to FIG. 7. The fan shroud 2B includes a rectangular portion 21B as shown in FIG. 7. The rectangular portion 21B includes upstream separated opening portions 41B, 42B, 43B, and downstream separated opening portions 51B, 52B, 53B. The number of the upstream separated opening portions 41B, 42B, 43B and the number of the downstream separated opening portions 51B, 52B, 53B are the same.

The opening area of each one of the downstream separated opening portions 51B, 52B, 53B are larger than that of the upstream separated opening portions 41B, 42B, 43B. Accordingly, the total opening area of the downstream separated opening portions 51B, 52B, 53B are larger than the total opening area of the upstream separated opening portions 41B, 42B, 43B. Specifically, the length of the upstream separated opening portions 41B, 42B, 43B is the same as the length of the downstream separated opening portions 51B, 52B, 53B, and the width of the downstream separated opening portions 51B, 52B, 53B is twice larger than the width of the upstream separated opening portions 41B, 42B, 43B.

Figure 8:
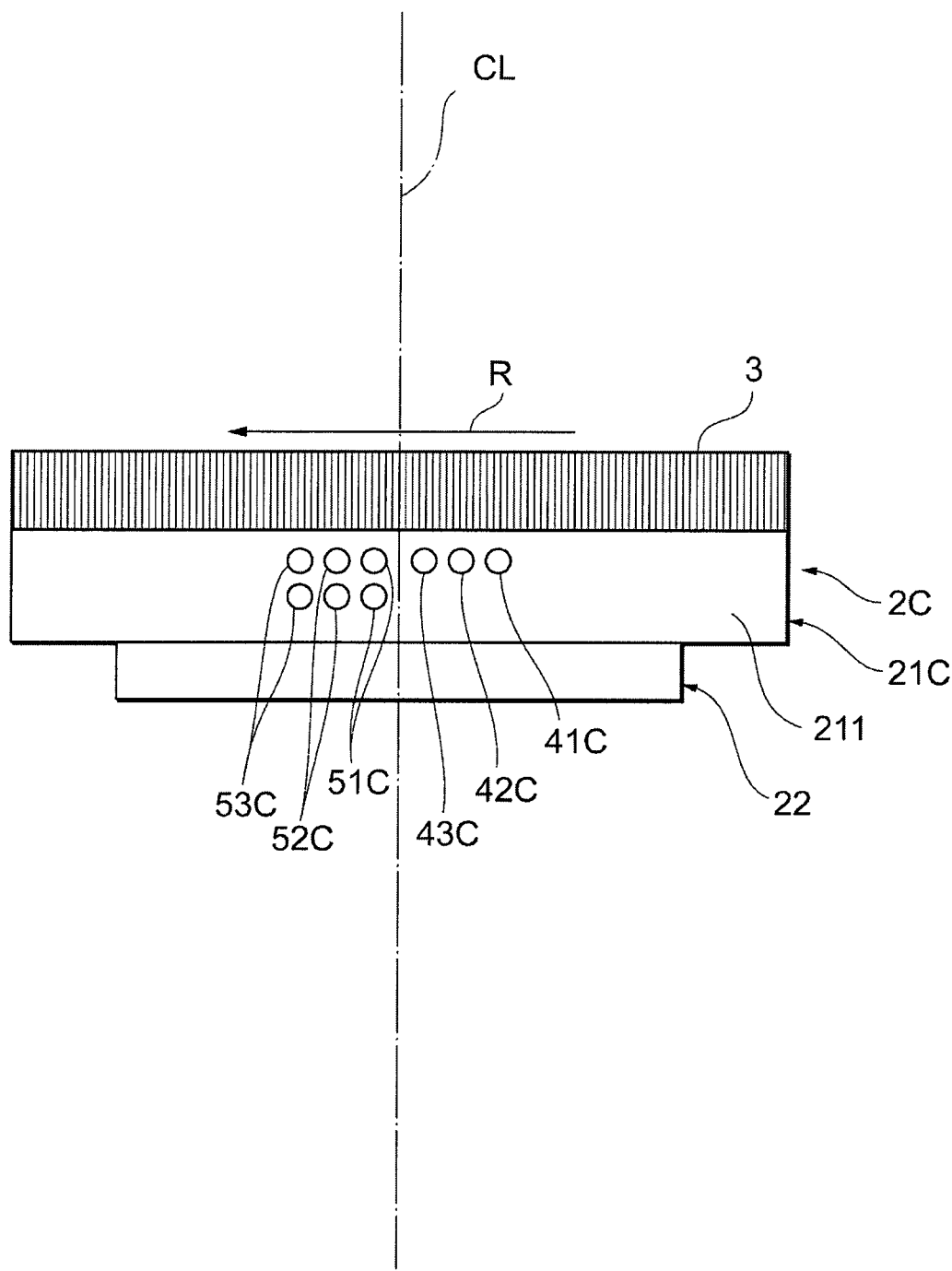
FIG. 8 is a plan view illustrating a fan shroud according to at least one embodiment of the present disclosure.

Next, a fan shroud 2C of a fourth embodiment will be described with reference to FIG. 8. The fan shroud 2C includes a rectangular portion 21C as shown in FIG. 8. The rectangular portion 21C includes three upstream separated opening portions 41C, 42C, and three downstream separated opening portions 51C, 52C, 53C.

The upstream separated opening portions 41C, 42C, 43C are circular openings. Each downstream separated opening portions 51C, 52C, 53C is a pair of circular openings having the same diameter as the upstream separated opening portions 41C, 42C, 43C. Accordingly, the total opening area of the downstream separated opening portions 51C, 52C, 53C are larger than the total opening area of the upstream separated opening portions 41C, 42C, 43C.

As described in the second embodiment through the fourth embodiment, each one of the downstream separated opening portions 51A-53A, 51B-53B, 51C-53C of the fan shroud 2A, 2B, 2C is larger in opening area than any one of the upstream separated opening portions 41A-43A, 41B-42B, 41C-43C.

The embodiments have been described with reference to above specific examples. However, the present disclosure is not limited to these specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

What is claimed is:

1. A fan shroud through which air flows from a suction port to a discharge port, the fan shroud comprising;
   a circular wall having a cylindrical shape, the circular wall defining the discharge port and accommodating a propeller fan; and
   a rectangular portion defining the suction port and including
      a close wall, and
      a farther wall farther from the circular wall than the close wall is from, wherein
   the close wall includes
      a closest portion closest to the circular wall, wherein the closest portion is a part including and around a center line passing through a rotation center of the propeller fan, and
      a pair of connection portions connected to the farther wall, the closest portion is between the pair of connection portions, the fan shroud further comprises:

an opening portion extending through the rectangular portion from inside to outside of the rectangular portion, wherein at least one of the pair of connection portions includes the opening portion, and the closest portion does not include the opening portion.

2. The fan shroud according to claim 1, wherein the pair of connection portions are a first connection portion and a second connection portion, the first connection portion, the closest portion, and the second connection portion are aligned, in order, in a rotation direction of the propeller fan, the opening portion includes a first opening portion provided in the first connection portion, and a second opening portion provided in the second connection portion, and a total opening area of the second opening portion is larger than a total opening area of the first opening portion.

3. The fan shroud according to claim 2, wherein the first opening portion includes first separated opening portions, and the second opening portion includes second separated opening portions.

4. The fan shroud according to claim 3, wherein an opening area of each one of the second separated opening portions is larger than an opening area of any one of the first separated opening portions.

5. The fan shroud according to claim 3, wherein a number of the second separated opening portions is larger than a number of the first separated opening portions.

* * * * *